United States Patent [19]

Shepard et al.

[11] Patent Number: 5,098,197

[45] Date of Patent: Mar. 24, 1992

[54] OPTICAL JOHNSON NOISE THERMOMETRY

[75] Inventors: Robert L. Shepard, Oak Ridge; Theron V. Blalock; Michael J. Roberts, both of Knoxville; Lonnie C. Maxey, Powell, all of Tenn.

[73] Assignee: The United States of America as represented by the United States Department of Energy, Washington, D.C.

[21] Appl. No.: 303,181

[22] Filed: Jan. 30, 1989

[51] Int. Cl.$^5$ .............................................. G01J 5/00
[52] U.S. Cl. ................................................... 374/120
[58] Field of Search .................. 374/120, 5, 9, 121, 374/130, 131, 175, 122; 356/43; 324/244.1; 364/557, 574

[56] References Cited

U.S. PATENT DOCUMENTS

| | | | |
|---|---|---|---|
| 3,878,723 | 4/1975 | Blalock et al. | 374/175 |
| 3,986,775 | 10/1976 | Chang et al. | 356/301 |
| 4,002,975 | 1/1977 | Erickson et al. | 324/96 |
| 4,634,290 | 1/1987 | Rosencwaig et al. | 374/5 |
| 4,804,264 | 2/1989 | Kirchhofer et al. | 356/44 |

FOREIGN PATENT DOCUMENTS

| | | | |
|---|---|---|---|
| 2153077 | 4/1973 | Fed. Rep. of Germany | 356/43 |
| 48524 | 5/1981 | Japan | 374/121 |
| 2140554 | 11/1984 | United Kingdom | 374/131 |

OTHER PUBLICATIONS

Brophy et al., The Review of Scientific Instruments, vol. 36, No. 12, Dec. 1965, pp. 1803-1806, "Correlator-Amplifier for Very Low Level Signals".

Primary Examiner—William A. Cuchlinski, Jr.
Assistant Examiner—W. Morris Worth
Attorney, Agent, or Firm—David E. Breeden; Stephen D. Hamel; William R. Moser

[57] ABSTRACT

Method and device for direct, non-contact temperature measure of a body. A laser beam is reflected from the surface of the body and detected along with the Planck radiation. The detected signal is analyzed using signal correlation technique to generate an output signal proportional to the Johnson noise introduced into the reflected laser beam as a direct measure of the absolute temperature of the body.

9 Claims, 2 Drawing Sheets

OPTICAL JOHNSON NOISE THERMOMETRY

BACKGROUND OF THE INVENTION

This invention, which is a result of a contract with the United States Department of Energy, relates generally to the art of remote temperature measuring systems and devices. More specifically this invention relates to laser based temperature measuring systems and devices.

In the past various means of non-contact temperature measurement have been proposed. Generally the known systems take the form of radiation thermometers. These devices are reasonably accurate under idealized or specific conditions. The characteristics of thermal radiation emitted by a radiant body depends not only upon its temperature, but also on the emissivity of the body's surface. This Planck radiation is detected over some wavelength range by either a thermal or photon detector. The problem is determining the emissivity variation with wavelength. It could, in principle, be measured by its absorbtivity since the emissivity and absorbtivity of a body are the same. This may be determined with a laser of the appropriate wavelength and then adjusting or compensating the radiometric measurement accordingly. Other approaches are (a) employ radiometric methods at very short wavelengths where the uncertainty in the emissivity causes a very small uncertainty in temperature, or (b) configure the sample so that it approximates a black body. These approaches are limited by (a) detection efficiency at short wavelengths, and (b) restrictions on the sample configuration. Therefore, it will be seen that there is a need for a method and device for non-contact temperature measurement which is independent of the body's surface emissivity and thereby provide an absolute measure of surface temperature.

SUMMARY OF THE INVENTION

In view of the above need, it is an object of this invention to provide a method and device for non-contact temperature measurement of a body which is independent of the surface emissivity of the body.

Further, it is an object of this invention to provide a method and device for non-contact temperature measurement as set forth in the above object which is based on measuring the radiated electromagnetic thermal noise energy produced by the random motion of electrons in the body material.

Yet another object of this invention is to provide a method and device as in the above objects wherein the measurement is carried out by directing a laser beam onto the body and measuring the noise content of the reflected beam to detect the noise content introduced into the reflected laser beam due to the interaction of the beam with the thermally agitated electrons of the material.

Other objects and many of the attendant advantages of this invention will be apparent from the following detailed description of preferred embodiments of the invention taken in conjunction with the drawings.

These objects are achieved in a method for non-contact temperature measurement of a body which comprises directing a laser beam onto the surface of the body and analyzing the reflected portion of the laser beam to measure the noise content corresponding to thermal noise modulation of the laser beam reflected from the body as a direct measure of the absolute temperature of the body.

In accordance with another aspect of the invention, the above objects are achieved in a device for non-contact temperature measurement of a body which comprises means for directing a laser beam onto the body, optical detecting means disposed to detect the reflected portion of the laser beam from the body and generating an output signal corresponding thereto and an analyzing means responsive to the output of the optical detecting means for generating an output signal proportional to the noise content of the signal corresponding to thermal noise modulation of the laser beam reflected from the body as a direct indication of the absolute temperature of the body.

DETAILED DESCRIPTION OF THE PREFERRED EMBODIMENTS

Figure 1:
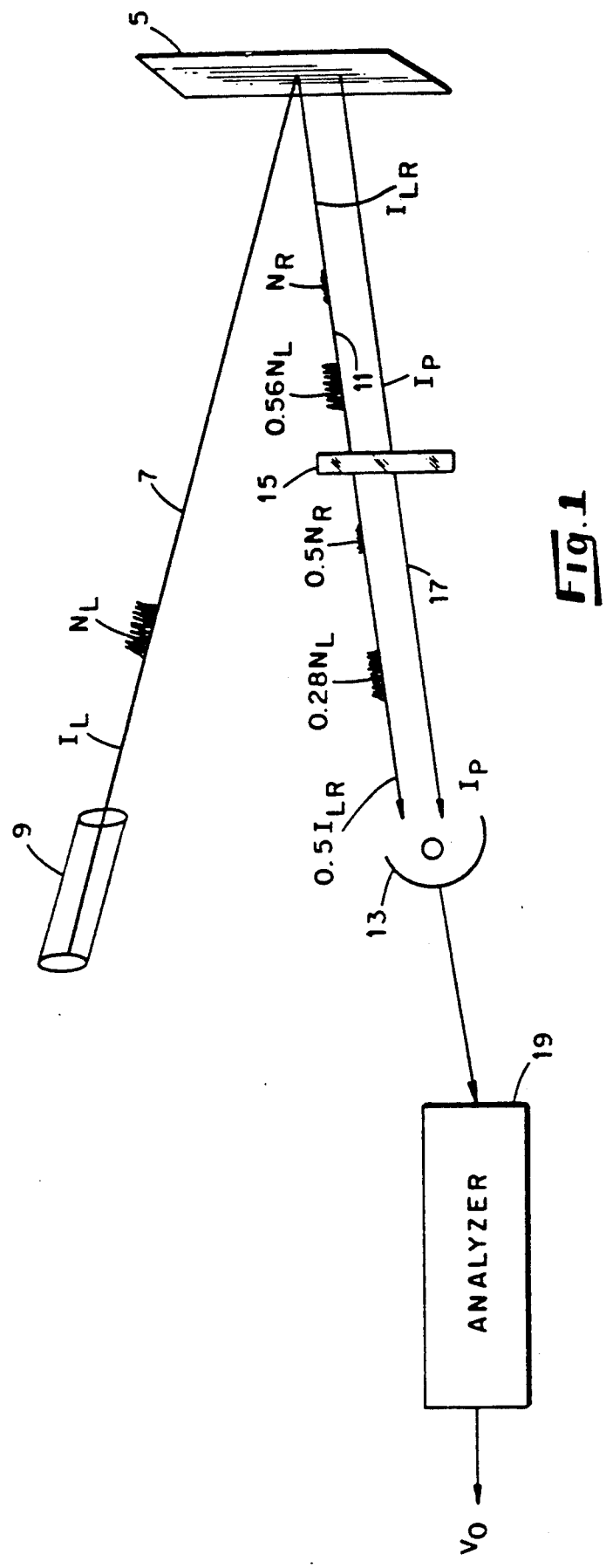
FIG. 1 is a schematic diagram illustrating a non-contact temperature measuring system based on detecting the optical Johnson noise modulation of a laser beam reflected from a body in accordance with the basic concept of the present invention.

The method and apparatus of this invention provide a means for direct, non-contact measurement of the temperature of a body based on the detection of increased noise of a laser beam due to its reflection from a hot surface. As pointed out above, the problem with most conventional non-contact temperature measuring techniques is the required knowledge of the emissivity of the material being measured. This is especially true for hot, refractory, solid and molten materials in the 2000–2500 K range in that the emissivity is not known. The uncertainty in emissivity introduces an uncertainty in the measured temperature which is large in comparison with the temperature accuracy required for control of recrystallization processes, for example, which may be of the order of one Kelvin. Further, in the process of containerless crystallization of metals where the molten metal is levitated, accurate non-contact thermometry methods must be employed.

Radiation thermometry generally observes the visible or infrared radiation emitted from thermally-excited bound electrons on the surface of a body. The spectral excitation depends on the emissivity of the particular material and its temperature. In contrast, the noise power of the conduction electrons which are in thermal equilibrium with the body's lattice provide information on the temperature of the material which does not depend on the particular material, but only on its temperature. These conduction electrons generate Johnson noise due to their displacement by thermal agitation. This Johnson noise is observable as small, wide-band electrical voltages or currents in passive resistors, a phenomenon successfully used in the Johnson noise power thermometer(JNPT), which is the subject of United States Patent 3,878,723 issued April 22, 1975 to Theron V. Blalock et al for "Thermal Noise Power Thermometry" and having a common assignee with the present invention. The JNPT provides absolute temperatures which are independent of the resistor material.

For non-contact thermometry to employ the JNPT concept, some means must ba developed to detect the Johnson noise without making electrical contacts to the levitated body. The Johnson noise is produced in a body of material that is above zero K through thermal agitation of the charge carriers(conduction electrons) in the material. This movement of charge must also radiate electromagnetic energy. However, this electromagnetic radiation would be very difficult to detect in an environment where large radio frequency fields are present.

Therefore, in this invention a non-contact method and means for carrying out the method of detecting the temperature ot a body is provided by detection of the Johnson noise produced by the thermal agitation of the conduction electrons through the detection and discrimination of the Johnson noise modulation of a laser beam reflected from the surface of the body. This technique is distinct from other known methods which use lasers to measure the reflectivity of a sample for deducing the emissivity of the body's surface. These techniques employ detection of either a change in amplitude or degree of rotation of the plane polarization of the reflected beam. The technique of the present invention does not measure the amplitude of the reflected beam, but only the increase in noise in the reflected laser beam due to the interaction between the incident beam and the thermally agitated conduction electrons near the surface of the body.

Referring now to FIG. 1, the present technique is illustrated in schematic diagram form to measure the temperature of a hot tungsten strip lamp 5. Although in theory the temperature of a body at any temperature above absolute zero may be measured with this technique, the discussion will be limited to the detection of hot-body temperatures which is the area most applicable for a non-contact temperature measuring system. A laser beam 7 from a continuous wave laser 9, such as a 3 milliwatt(mW) He-Ne laser tuned to a wavelength of 632.8 nanometers(nm), is directed onto the strip lamp 5 having a reflectance of about 0.56, in a manner such that the reflected portion 11 of the beam is directed onto a photodetector 13 through an optical filter 15 having a 1 nm bandwidth centered about 633 nm. Other laser-filter combinations may be used to select wavelengths that provide more effective surface noise modulation effects and minimize the contribution of the Planck radiation. The photodetector 13 may be a conventional PIN photodiode which produces an analog output signal corresponding to the light signal detected thereby. The light signal is reduced in amplitude by approximately 50% as it passes through the filter 15. The output of the photodiode 13, which includes a component due to the Planck radiation 17 from the strip 5 passing through the filter 15 and viewed by the detector, is applied to the input of a correlation type analyzer 19 to produce an output signal $V_o$ proportional to the Johnson noise modulation of the reflected laser beam 11 and thus the absolute temperature of the strip 5.

In accordance with the method of the present invention, the laser beam 7 is directed onto the body 5, whose temperature is to be measured, and the resultant reflected laser beam along with the Planck radiation from the body is detected by photodetector 13 and the detected signal is subsequently analyzed by the analyzer 19 to produce the output signal $V_o$ proportional to the correlated AC noise, and thus the absolute temperature of the body 5. The laser beam incident on the body 5 contains a DC (intensity $I_L$) component and an AC (laser noise NL) component. The beam reflected from the hot body 5 contains a reduced DC component $I_{LR}$ from surface reflection, an attenuated AC component of laser noise 0.56 $N_L$, additional AC noise due to vibrational behavior of the body 5, and an added AC signal $N_R$ due to "reflectance noise." In addition, the signal channels within the analyzer 19 have AC and DC gains and introduce additional AC noise. By subtraction and correlation, the DC signal component $I_{LR}$, the laser noise $N_L$, and the uncorrelated AC noise can be removed, leaving only the correlated AC noise at the output. The uncertainty of the final output value of the reflectance noise depends inversely on the square root of the product of the integration time and the bandwidth of the measurement channel. Further details of the correlation type analyzer are provided hereinbelow in the description of FIG. 2.

Figure 2:
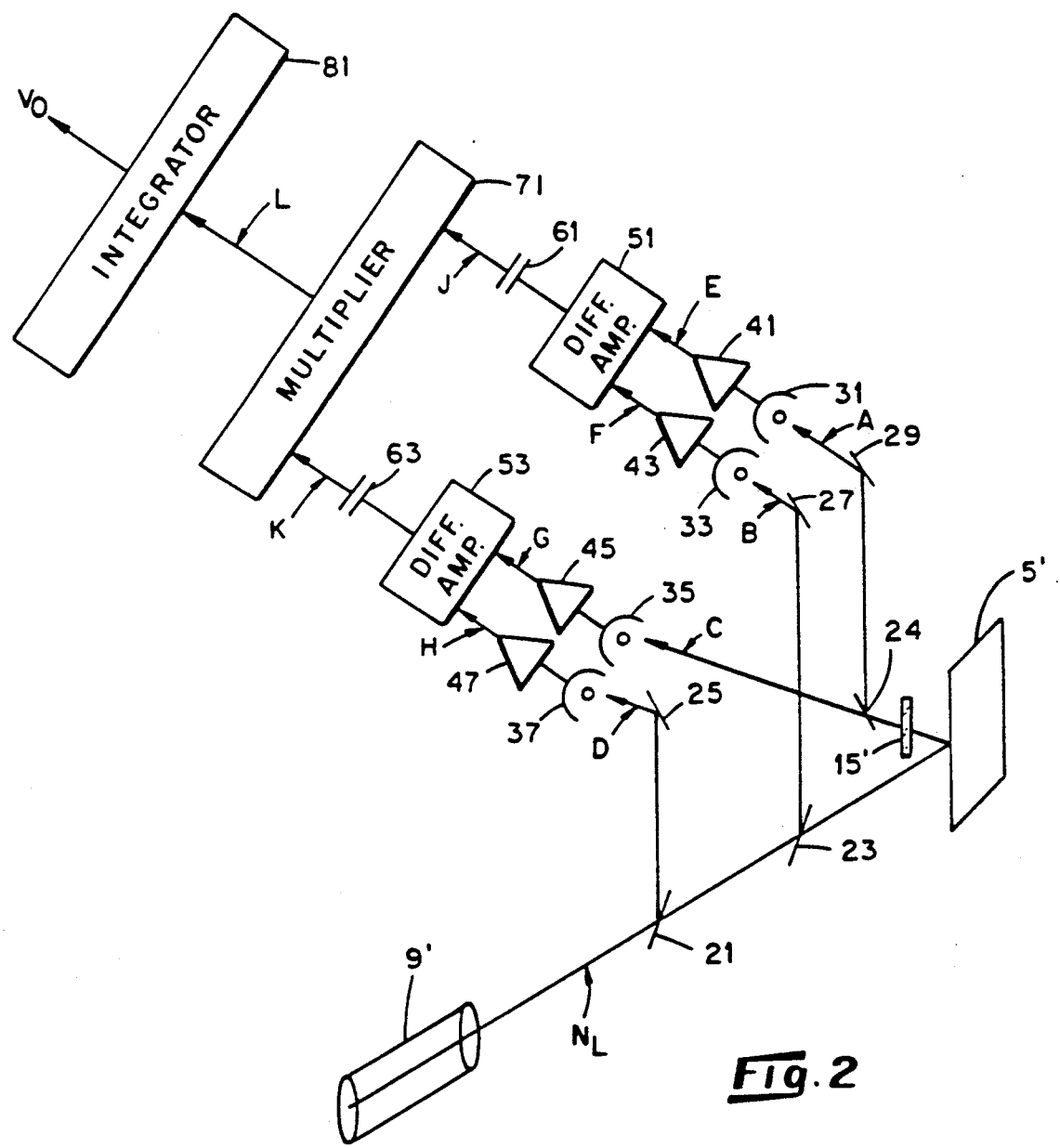
FIG. 2 is a schematic block diagram of a further embodiment of the invention wherein identical parts are indicated by like primed reference numerals. This embodiment includes details of signal detection and correlation circuits used to detect and analyze the optical radiation signal from a hot body to measure the optical thermal noise signal as a direct indication of the absolute temperature of the body.

Referring now to FIG. 2, wherein a preferred form of the correlation type analyzing system is shown for extracting the noise signal $V_o$ indicative of the temperature of a tungsten strip lamp 5', simulating the hot body. The laser beam from the laser source 9' is directed through first and second beam splitters 21 and 23 onto the body 5'. The reflected portion D of the beam from splitter 21 is directed by means of a reflector 25 onto one photodetector 37 of a group of four detectors 31-37. The reflected portion of the beam B from splitter 23 is directed by means of a reflector 27 onto photodetector 33. The Johnson noise modulated ($N_R$) beam reflected from the body 5' is filtered by means of an optical filter 15', as in FIG. 1, and split into two beams, A and C, by means of a splitter 24. The beams A and C are then directed onto separate photodetectors 31 and 35, the beam A being properly directed by means of a reflector 29. The outputs of the photodetectors 31-37 are separately connected to inputs of corresponding signal amplifiers 41-47 which produce corresponding analog output signals E, F, G, and H proportional to the light beam signals A, B, C, and D, respectively. The outputs E and F from amplifiers 41 and 43, respectively, are fed to separate inputs of a first differential amplifier 51, while the outputs G and H from amplifiers 45 and 47, respectively, are fed to separate inputs of a second differential amplifier 53. The differential amplifiers 51 and 53 produce signals J and K, respectively, which are AC coupled through corresponding capacitors 61 and 63 to separate inputs of a multiplier circuit 71 and the product of these signals (L) is provided at the output thereof. This signal is provided to the input of an integrator 81 from which the signal $V_o$ proportional to the Johnson noise is obtained. In operation, the laser beam containing noise $N_L$ is directed onto the surface 5' whose temperature is to be measured. A portion of the beam is reflected from the body 5' which contains increased noise as indicated by $N_R$. The noise in the reflected signal includes, in addition to the laser source noise $N_L$, a component corresponding to the modulation of the reflected beam by the thermal noise of the conduction electrons on the surface, mechanical noise of the body 5', and the Planck radiation noise. This reflected beam modulated with the noise signal $N_R$ is filtered by the band-pass filter 15' and divided into beams A and C and detected by detectors 31 and 35, respectively. The initial laser beam including noise modulation $N_L$ is split into beams B and D and detected by detectors 33 and 37, respectively. The detectors 31 through 37 and corresponding amplifiers 41 through 47 introduce additional uncorrelated noise into the detected and amplified signals E, F, G, and H. The differential amplifiers 51 and 53 perform an analog subtraction operation between signals E and F and signals G and H, respectively to reduce the correlated noise common to all beams A.D and pass the uncorrelated noise from the surface reflection and the detectors and amplifiers to output signals J and K. The signal J contains the uncorrelated noise from detectors 31 and 33 and the associated amplifiers plus the reflection noise $N_R$. Signal K contains the uncorrelated noise from the detectors 35 and 37 and associated amplifiers plus the reflection noise NR. These signals are AC coupled through capacitors 61 and 63 to the multiplier 71 inputs to reject low-frequency correlated noise. The multiplier 71 reduces the uncorrelated noise in signals J and K and passes the correlated noise of the body 5' surface reflections and any unfiltered mechanical or Planck radiation noise as signal L. The signal L is integrated to produce a DC signal $V_o$ whose amplitude is proportional to the Johnson noise power of the reflected beam.

Although the output signal may contain components which are due to Planck radiation noise or other broadband noise, this component may be determined by performing the measurement with the laser off, in which case the Johnson noise power component is absent from the output signal $V_o$. By subtracting this component from the total $V_o$ noise signal, the amplitude of $V_o$ corresponding to the Johnson noise modulation may be obtained. However, the output signal $(V_o)$ in FIG. 2 is proportional to the body temperature.

It is calculated that the Planck radiation ($I_p$ in FIG. 1) is three orders of magnitude smaller than the intensity of the reflected laser power ($I_{LR}$) at the photodetector 13. It is estimated that the Planck radiation contains a quantum noise of about $10^{-19}$ W/Hz which is not temperature dependent and a Planck noise of about $10^{-23}$ W/Hz which is temperature dependent. The laser noise ($N_L$) arriving at the photodetector is about one microwatt or 0.1% of the laser power. Hence, the Planck radiation intensity and noise are small compared with the laser intensity and noise. The reflectance noise ($N_R$) is estimated to be proportional to the thermal noise power of the conduction electrons in the surface of the hot sample which is calculated to be about $10^{-15}$ W at 2500 K. Assuming that the surface reflection modulation process is efficient, the signal processor needs to extract by correlation, a temperature-dependent reflectance noise signal from a laser noise background that is about six orders of magnitude larger, assuming that the uncorrelated noise generated in the photodetector and amplifiers is reduced accordingly. Success in this signal processor requires the subtraction by the differential amplifiers and multiplication by the correlator to achieve about one part in $10^8$ discrimination, dependent on the bandwidth and integration times used.

Thus it will be seen that a non-contact temperature measuring method and device have been provided for measuring the temperature of a body based on measuring the optical Johnson noise introduced in a laser beam reflected from the body as a direct indication of the body temperature which is independent of the body's emissivity.

Although the invention has been illustrated by means of specific embodiments, it will be obvious to those skilled in the art that various modifications and changes may be made therein without departing from the spirit and scope of the invention as set forth in the appended claims attached to and forming a part of this specification. For example, the detected signals may be filtered electronically to reduce the laser noise component and thereby enhance the detection of the Johnson noise modulation.

We claim:

1. A method for non-contact measurement of the temperature of a body, comprising the steps of:
    directing a laser beam onto the surface of said body to produce a reflected portion of said beam which includes an optical Johnson thermal noise modulation component produced by the interaction of said laser beam with the temperature dependent random motion of conduction band electrons at the surface of said body; and
    analyzing said reflected portion of the laser beam from said body to measure the Johnson thermal noise modulation of the reflected portion of the laser beam from said body as a direct indication of the absolute temperature of said body.

2. The method as set forth inn claim 1 further including the step of passing said reflected portion of said laser beam through a band-pass optical filter having a narrow bandwidth centered about the wavelength of said laser beam.

3. The method as set forth in claim 2 wherein said laser beam is a Helium-Neon laser beam having a wavelength of 632.8 nanometers and a beam power of about 3 milliwatts.

4. A device for non-contact measurement of the temperature of a body, comprising:
    a laser for producing a Laser beam of a selected optical wavelength;
    means for directing at least a portion of said laser beam onto said body to produce a reflected portion of said beam which includes an optical Johnson thermal noise modulation component produced by the interaction of said laser beam with the temperature dependent random motion of conduction band electrons at the surface of said body;
    optical detecting means disposed to detect the reflected portion of the laser beam from said body and generating an output signal corresponding thereto; and
    an analyzing means responsive to the output of said optical detecting means for generating an output signal proportional to the noise content of the signal corresponding to Johnson thermal noise modulation of the reflected portion of said laser beam as a direct indication of the absolute temperature of the body.

5. A method for non-contact measurement of the temperature of a body comprising the steps of:
    directing a portion of a laser beam of a selected optical wavelength onto said body to produce a reflected beam which includes an optical Johnson noise modulation component produced by the interaction of aid laser beam with the temperature dependent random motion of conduction band electrons at the surface of said body;
    detecting portions of said reflected beam and incident portions of said laser beam at first and second pairs of optical detectors, respectively, and generating corresponding first and second pairs of analog electrical signals at corresponding outputs thereof;

analyzing said first and second pairs of analog electrical signals by corresponding first and second analog signal subtraction circuit means for generating first and second difference signals corresponding to the difference in said first and second pairs of analog electrical signals applied to the respective inputs thereof; and correlating said first and second difference signals to generate an output signal proportional to the correlated signal content thereof indicative of the Johnson thermal noise component of aid reflected beam as a direct indication of the absolute temperature of said body.

6. A device for non-contact measurement of the temperature of a body, comprising:

a laser for producing a laser beam of a selected optical wavelength;

means for directing at least a portion of said laser beam onto said body to produce a reflected portion of said beam which includes an optical Johnson noise modulation component produced by the interaction of said laser beam with the temperature dependent random motion of conduction band electrons at the surface of said body;

first and second pairs of optical detectors, each pair of said optical detectors disposed to detect a portion of said reflected beam from said body at one detector and an incident portion of said laser beam at the other of said pair of detectors and generating first and second analog electrical signals corresponding thereto; and an analyzing circuit including first and second analog signal subtraction circuit means responsive to separate ones of said first and second pairs of analog electrical signals for generating first and second difference signals corresponding to the difference in said first and second pairs of analog electrical signals applied to inputs thereof and a correlation circuit means having first and second inputs responsive to said first and second difference signals for generating an output signal proportional to the correlated signal content of said first and second difference signals indicative of the Johnson thermal noise component of said reflected beam as a direct indication of the absolute temperature of said body.

7. The device as set forth in claim 6 wherein each of said first and second analog signal subtraction circuit means includes a differential amplifier having first and second input connected to receive corresponding ones of said outputs from said first and second pairs of optical detectors, respectively, and an output.

8. The device as set forth in claim 6 further including a band-pass optical filter having a narrow bandwidth centered about the wavelength of said laser beam and disposed in the path of said reflected portion of said laser beam.

9. The device as set forth inn claim 8 wherein said laser is a helium-neon laser having an output of about 3 milliwatts and tuned to a wavelength of about 632.8 nanometers.

* * * * *